United States Patent [19]

Crull et al.

[11] 3,999,386
[45] Dec. 28, 1976

[54] OVERSPEED PROTECTION CONTROL FOR AN ENGINE

[75] Inventors: Stanley W. Crull; Donald J. MacIntosh, both of Ames, Iowa

[73] Assignee: Sundstrand Corporation, Rockford, Ill.

[22] Filed: Sept. 11, 1975

[21] Appl. No.: 612,274

[52] U.S. Cl. .................................. 60/423; 60/431; 60/468; 60/494

[51] Int. Cl.² ................... F15B 15/18; F15B 20/00

[58] Field of Search ............ 60/423, 431, 433, 449, 60/450, 459, 468, 494, DIG. 2, 905; 91/412; 417/1, 22

[56] References Cited

UNITED STATES PATENTS

| | | | |
|---|---|---|---|
| 2,255,783 | 9/1941 | Kendrick | 60/450 X |
| 2,981,067 | 4/1961 | Clark et al. | 60/468 |
| 3,355,994 | 12/1967 | Malott | 91/412 |
| 3,540,218 | 11/1970 | Finn | 60/430 |

*Primary Examiner*—Edgar W. Geoghegan
*Attorney, Agent, or Firm*—Wegner, Stellman, McCord, Wiles & Wood

[57] ABSTRACT

An overspeed protection control for an engine which drives at least one pump and having valve means selectively operable to cause an increase in pressure in a circuit supplied by said pump and a resulting increase in load torque on the engine. Means responsive to the engine speed exceeding a predetermined value causes operation of the valve means, and includes a control valve positionable either in response to a pressure differential across an orifice in the circuit supplied by the pump with the pressure differential being an indication of flow rate and, therefore, engine speed, or operable by a control circuit including means for detecting engine speed.

18 Claims, 5 Drawing Figures

OVERSPEED PROTECTION CONTROL FOR AN ENGINE

BACKGROUND OF THE INVENTION

In many situations, it is desirable to limit the speed of an engine and this limiting may be accomplished hydraulically when the engine is driving a pump. More specifically, the speed of an engine driving a pump may be controlled to prevent overspeed by increasing pressure in a line supplied by the pump to impose a load torque on the engine which reduces engine speed.

Currently, many dozer or loader tractors are driven by a hydrostatic transmission. In order for the pump and motor of the hydrostatic transmission to operate near their normal design limits, there must be some assurance that unexpected or infrequent operating conditions will not cause the speed of the pump or motor of the hydrostatic transmission to exceed maximum safe design limits. Such unexpected or infrequent operating conditions could include an externally applied load, such as gravity effects on the tractor on a steep hill, or pushing effects of other vehicles. When such externally applied load causes an increased speed of the tractor and, thus, of the prime mover engine coupled to the hydrostatic transmission, there is a possibility of exceeding maximum safe design limits for the pump and motor of the transmission.

SUMMARY

A primary feature of the invention disclosed herein is to provide means for imposing an increased load torque on an engine driving a pump when a predetermined engine speed is exceeded. More particularly, the engine drives a fixed displacement pump, as for an implement circuit, and valve means are associated with a circuit supplied by the pump and caused to increase pressure in the circuit when a predetermined engine speed is exceeded in order to increase the load torque on the engine to reduce the engine speed.

A particular application of the overspeed protection control is in a dozer or loader tractor wherein the prime mover engine drives a hydrostatic transmission for the vehicle drive train and also drives a fixed displacement pump supplying an implement circuit of the tractor. The implement system pump is normally of substantial capacity and may be capable of absorbing from 40 to 80% of engine horsepower at rated speed. With the control disclosed herein, an excess of engine speed over a predetermined value is sensed and, when this occurs, valve means are operated to increase the pressure of the fluid in the implement circuit which increases the load on the implement pump and, therefore, the load torque on the engine to reduce the engine speed. This reduction in engine speed functions to limit overspeeding of the pump and motor of the hydrostatic transmission to an acceptable level with the result that the hydrostatic transmission components can be utilized near their normal design limits.

The engine overspeed protection control disclosed herein has utility in any situation wherein a prime mover, such as an engine driving a pump, is caused to overspeed. A primary aspect of the control is the sensing of an overspeed condition and the imposition of additional loading on the pump and the prime mover driving the pump to reduce the overspeed condition.

The inventive concept is disclosed herein in a number of different embodiments, with the overspeed protection including valve means selectively operable to cause an increase in pressure in a circuit supplied by a fixed displacement pump to result in an increase in load torque on the engine, and means responsive to the engine speed exceeding a predetermined value to render said valve means operable.

In an overspeed protection control, as defined in the preceding paragraph, the responsive means may include an orifice in the fluid circuit supplied by the fixed displacement pump for creating a pressure differential and a pilot operated valve responsive to the pressure differential when said differential reaches a certain valve, dependent upon flow through the orifice which indicates engine speed, for shift to a position whereby the aforesaid valve means are operated to cause an increase in pressure in the fluid circuit.

Alternatively to the use of an orifice in the fluid circuit, the responsive means, as set forth above, may include a power operated valve for controlling said valve means and a control circuit for the power operated valve responsive to speed sensing means associated with the engine. In this embodiment, there is no orifice for creating a pressure differential whereby there is no pressure drop in the fluid circuit as occurs when an orifice is used.

DESCRIPTION OF THE PREFERRED EMBODIMENTS

Figure 1:
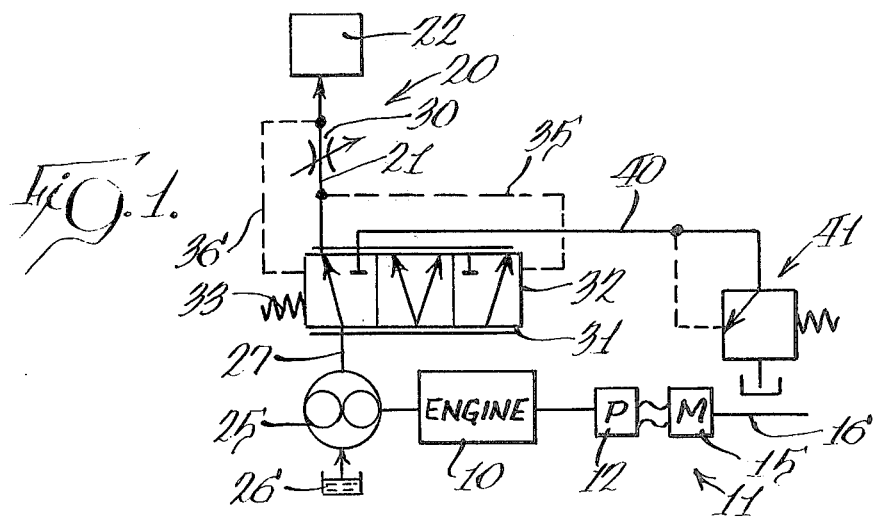
FIG. 1 is a schematic view of an overspeed protection control in association with a prime mover and a hydrostatic transmission.

In the embodiment of FIG. 1, a prime mover engine 10 drives a hydrostatic transmission, indicated generally at 11, having a pump 12 connected to the drive outut of the engine and a motor 15 driving an output shaft 16 which may connect to the drive train for a vehicle, such as a dozer or loader tractor. Such a vehicle has a hydraulic circuit for applying power to implements which are operated as required, with this circuit being indicated at 20 and including a line 21 leading to a valve 22 which is under the control of an operator for working a blade or other implement of the tractor. The hydraulic circuit 20 is supplied by a fixed displacement pump 25 having an inlet connected to a reservoir 26 and an outlet line 27 connected to the line 21 through valve means to be described.

When an externally applied load, such as gravity effects on a steep hill or a pushing effect from another vehicle, tends to increase the speed of rotation of the output shaft 16 of the hydrostatic transmission, there may be a resulting overspeed of the engine 10. The overspeed protection control embodies valve structure to cause an increase in pressure in the outlet line 27 when the engine speed exceeds a predetermined value to increase the load torque on the engine and limit the overspeeding. The control also includes means for detecting engine overspeeding and causing operation of the pressure increasing valve structure. A variable orifice 30 in the line 21 establishes a pressure differential in the line 21 across the orifice which is applied to a flow control valve 31. The flow control valve 31 has a valve member 32 urged by a spring 33 to the position shown in FIG. 1 and having a position shifted to the left from the position shown in FIG. 1 with intermediate flow controlling positions. This valve may be Sundstrand Corporation's Model 5150 Pressure Compensated Directional Valve. The pressure upstream of the orifice 30 is applied through a pilot line 35 to the right-hand end of the valve member to act in opposition to the spring 33 and the pressure downstream of the orifice is applied through a pilot line 36 to the left-hand end of the valve member 32. The orifice is shown as adjustable and the size thereof is selected to permit a certain rate of flow through the implement circuit without a sufficient pressure differential created thereby to cause shift of the valve member 32. When there is a rate of flow in excess of said certain rate, the pressure differential across the orifice is sufficient to shift the valve member 32 toward the left, as shown in FIG. 1. For example, the orifice size may be set to permit flow of 55 gpm of oil to the valve 22, which is that amount of oil delivered by the pump 25 at an engine speed which is 50 rpm above engine high idle, without any control effect. Whenever flow from the pump 25 exceeds the set value, as for example 55 gpm, the pressure differential is sufficient to shift the valve member 32 to the left in FIG. 1, whereby oil in excess of the set rate of flow is diverted through a line 40 to a relief valve, indicated generally at 41. The relief valve 41 is set to open at some predetermined pressure and the oil in line 40 is caused to increase to a pressure equal to that which will open the pressure relief valve, which results in imposing increased pressure in the system and loading of the pump 25 and, therefore, imposing load torque on the engine 10 which reduces engine speed.

Vehicles of the type which would have the overspeed protection control used therewith normally have a substantial pump 25 for the implement system, with such pumps normally capable of absorbing from 40 to 80% of engine horsepower at rate speed. In view of this, the increased load torque on the engine is of a magnitude to substantially reduce engine speed when an overspeed condition occurs.

As stated previously, with the overspeed protection control for the engine, it is possible to use the elements of a hydrostatic transmission near their normal design limits, since there will be assurance that the pump and motor of the hydrostatic transmission will not be driven at a speed which exceeds maximum safe design limits.

Although the first embodiment of the overspeed protection control has been shown in association with a system wherein the engine is driving a hydrostatic transmission, it is not intended to limit the invention thereto, since the overspeed protection control can be used in any situation wherein an engine driving a pump is caused to overspeed.

The overspeed protection control will operate at any time that the engine exceeds a predetermined speed, since there is always oil flow in the hydraulic implement circuit.

Figure 2:
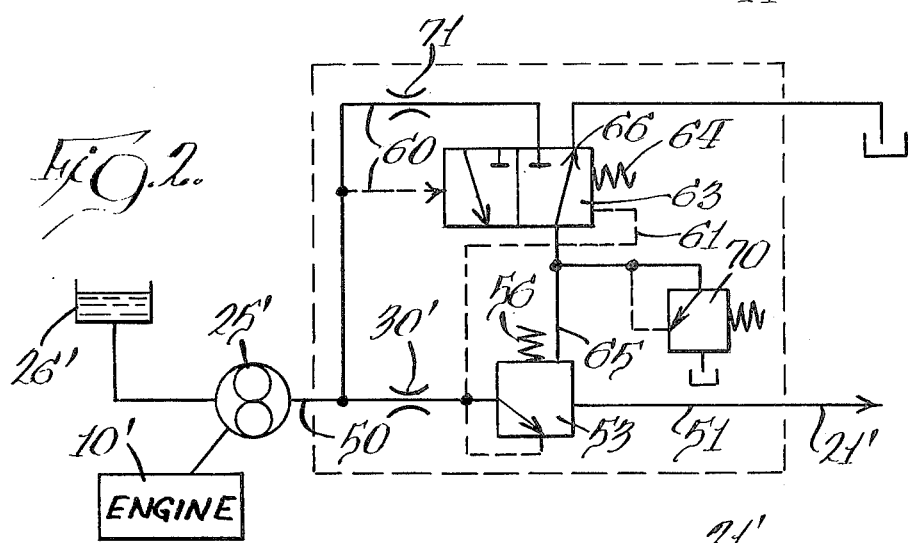
FIG. 2 is a schematic view of a second embodiment of an overspeed protection control.
Figure 3:
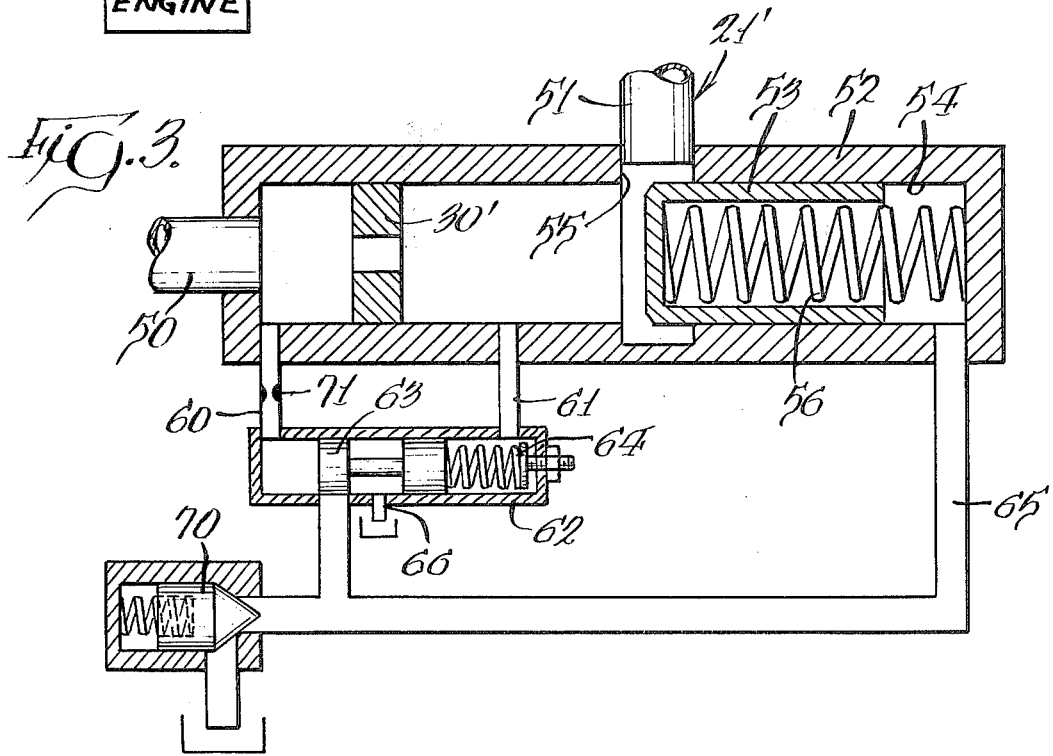
FIG. 3 is a partial view of the control shown in FIG. 2 with valve components shown in section.

In the embodiment of FIGS. 2 and 3, parts corresponding to those disclosed in FIG. 1 have been given the same reference numeral with a prime affixed thereto.

In this embodiment, the hydraulic implement circuit 21' has a line 50 ahead of the orifice 30' and a line 51 downstream thereof which connect to a valve means having a casing 52 housing a valve member 53 which is movable within a spring chamber 54 of the casing and urged toward a valve seat 55 by a spring 56.

The orifice 30' establishes a pressure differential when there is flow through the hydraulic implement circuit 21', with this pressure differential being directed through pilot lines 60 and 61 to a valve 62 and applied to opposite ends of a valve member 63. The valve member 63 is normally urged to the left, as shown in FIG. 3, by a spring 64 whereby a line 65 extending to the spring chamber 54 of the valve means is connected to a sump port 66. This results in there being no pressure buildup in the spring chamber 54, whereby oil may flow from the pump 25' through the hydraulic implement circuit 21' and with there only being the force of the spring 56 and flow to the line 51 acting in opposition to flow through the implement circuit. When the flow through the hydraulic implement circuit is at a rate which indicates engine overspeeding, the pressure differential across the orifice 30' is then adequate to shift the valve member 63 toward the right from the position shown in FIG. 3 wherein line 65 is cut off from the sump port 66 by a land of valve member 63 and the circuit pressure existing in advance of the orifice and in pilot line 60 is directed through the line 65 to the spring chamber 54. This moves the valve member 53 in a direction toward the valve seat 55 to close off flow to the line 51. This places a back pressure in the line 50 which places a load on the implement pump 25' and, therefore, on the engine 10' causing a decrease in engine speed. In order to prevent pressure in line 50 rising in an unlimited manner, a relief valve 70 is connected in line 65 and is set to open at a given pressure to limit the pressure in the spring chamber 54. A force balance on the valve member 53 requires that the forces due to pressure in the spring chamber 54, the spring 56, and flow to line 51 must equal the force caused by the pressure upstream of the valve seat 55. The pressure in spring chamber 54 is limited by the relief valve 70 and, therefore, the pressure in advance of the valve seat 55 will be some value thereabove sufficient to overcome the flow forces and the force of spring 56.

The only time that oil is lost from the system is when the pressure in spring chamber 54 is being controlled by the relief valve 70. This oil is limited to a small amount by the provision of an orifice 71 in line 60. Additionally, this loss occurs at a time when the pump 25' is delivering oil in excess of the rated amount so that the loss will not be noticed. Whenever the pump 25' is delivering less oil than rated in normal speed operation, no oil is lost from the system and there is no effect on the operation of downstream function which demand oil at high pressure.

Figure 4:
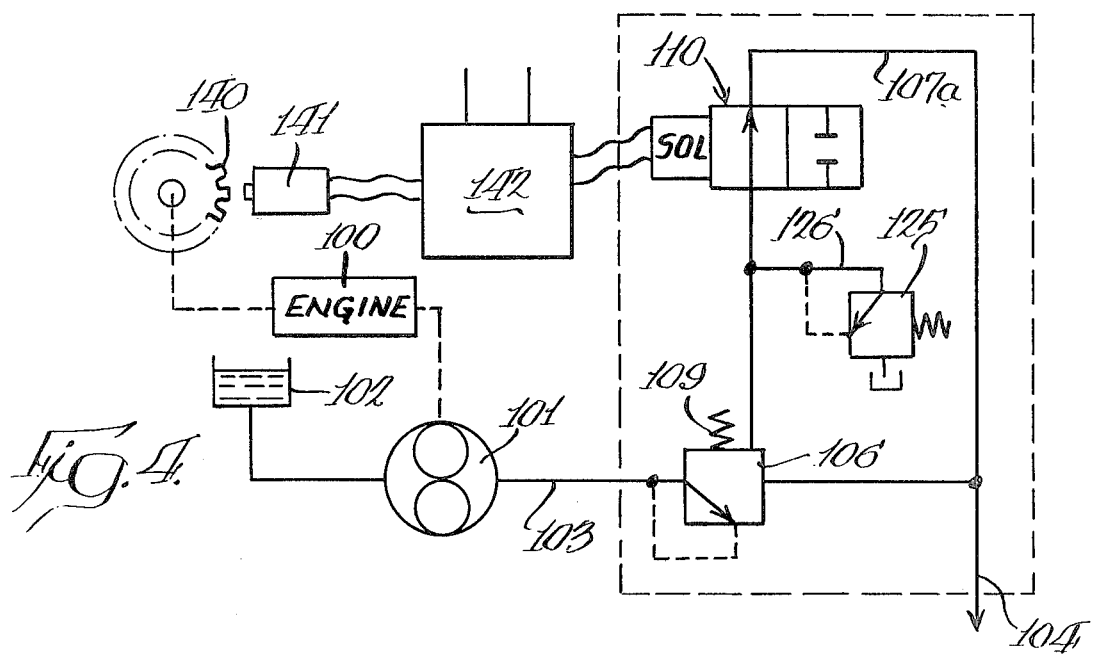
FIG. 4 is a schematic view of a third embodiment of the overspeed protection control.
Figure 5:
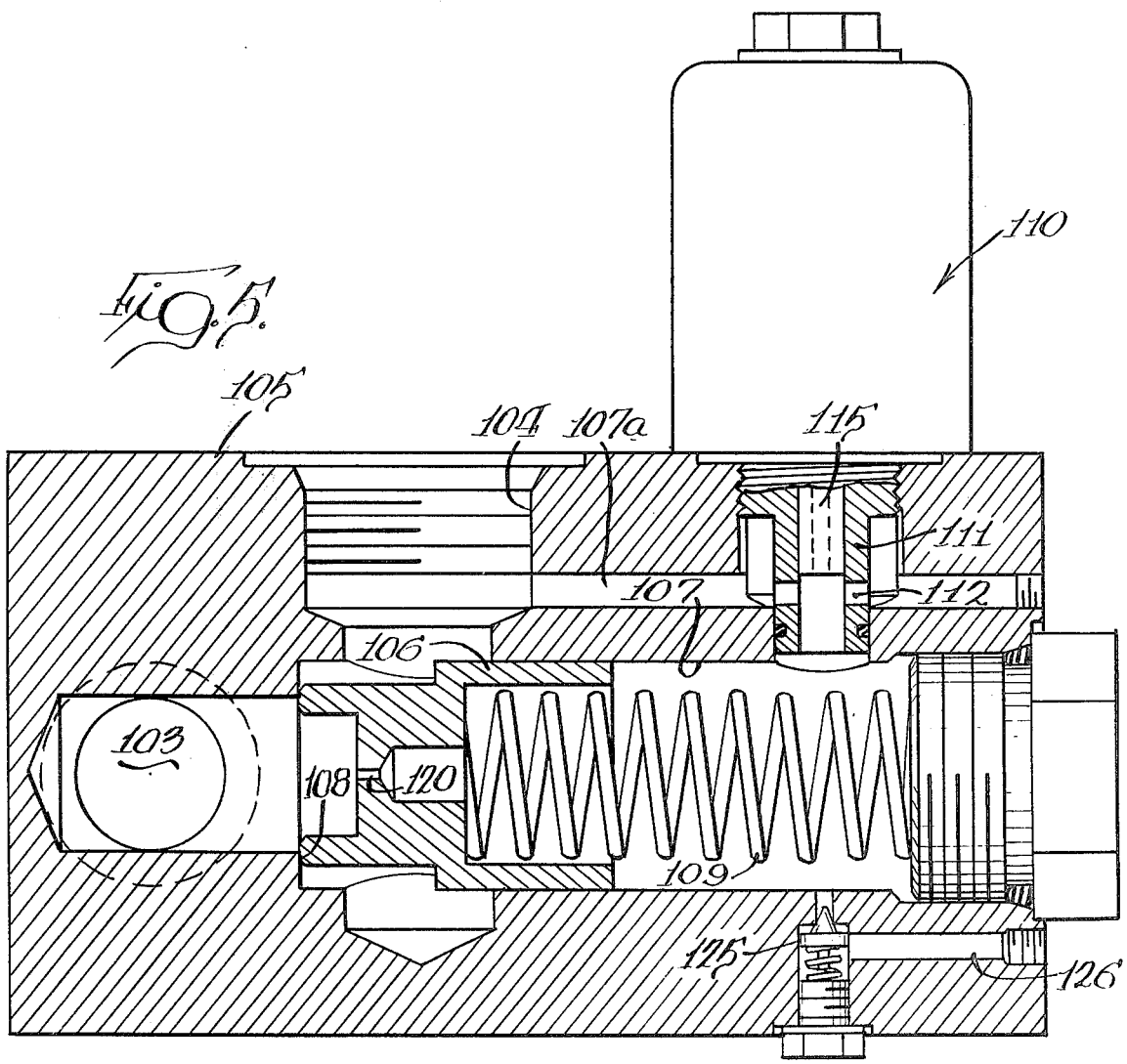
FIG. 5 is a central sectional view of a structure embodying the valve components of the control shown in FIG. 4.

A third embodiment is shown in FIGS. 4 and 5. In this embodiment, an engine 100 drives a pump 101 supplied from a reservoir 102 to provide fluid flow to an implement hydraulic circuit line 103 having an outlet line 104. A valve casing 105 mounts a valve member 106 in a chamber 107 which is urged toward a valve seat 108 by a spring 109 in the chamber. The valve member 106, when closed against the valve seat 108, blocks flow through the implement circuit line 103 to the outlet line 104.

In normal operation, there is flow through the implement circuit, with the only resistance to flow being the spring force of spring 109 and the flow forces past the valve member.

The chamber 107 communicates with the outlet line 104 of the implement circuit through a passage 107a in the valve casing 105 and normally open ports 112 of a sleeve member 111 associated with the power operated valve which, as shown, is a solenoid valve, indicated generally at 110. The sleeve member 111 is fitted in the valve casing 105 and the ports 112 are aligned with the passage 107a. The solenoid valve has a movable plunger 115 and, when the engine speed is excessive, the plunger 115 is depressed, upon energization of the solenoid, to block the ports 112 and, thus, block communication between the chamber 107 and the outlet line 104.

With the solenoid valve 110 deenergized, the pressure in the implement circuit causes the valve member 106 to be open and with the minimum pressure required depending on flow forces and forces caused by the spring 109. The valve member has a restricted passage 120 therethrough whereby fluid under pressure can enter the chamber 107. However, this fluid will be at the pressure of the outlet line 104 because of the communication through the ports 112 and passage 107a and will not act to close the valve. Upon energization of the solenoid valve 110, the chamber 107 is closed off from the outlet line 104 and, the pressure within the chamber 107 builds up to the pressure at the inlet line 103 by communication through the restricted passage 120. As the pressures at both sides of the valve member 106 approach the same value, spring 109 acts to move the valve member 106 to a closed position against the valve seat 108 causing a buildup of pressure in the line 103 and increased torque loading on the engine 100.

When the pressure in the spring chamber 107 reaches a certain value, a relief valve 125 positioned in a casing passage 126 opens to permit flow from the chamber 107 through the passage 126 to sump to thus limit the pressure in the chamber 107 and correspondingly permit some movement of the valve member 106 to the right off the valve seat 108 whereby the pressure in line 103 is some value above that in the chamber 107. This operation corresponds to that described in connection with the embodiment of FIGS. 2 and 3.

In the embodiment of FIGS. 4 and 5, there is no orifice in the circuit for obtaining a pressure differential signal of a certain value to initiate operation of the overspeed protection control. In this embodiment, an electrical control is disclosed wherein an engine speed pickup is utilized and which may be in the form of a toothed gear 140 driven by the engine with a known type of magnetic pickup device 141 associated with the toothed gear which provides an indication of speed and inputs this signal to a control unit 142. The control unit, in a conventional manner, compares the input speed signal from the device 141 with a preset speed signal and, when the actual speed is in excess of the preset speed, provides an electrical output signal to the solenoid valve 110 for energization thereof to lower the plunger 115 and block the flow from chamber 107 to the outlet line 104.

The overspeed protection control disclosed in FIGS. 4 and 5 has a number of significant features. When the engine is operating at normal speed, there is a very low pressure drop in the system, since there is no sensing orifice in the implement circuit. As in the second embodiment of FIGS. 2 and 3, there is no loss of oil to sump except during operation of the relief valve 125 which provides for relief when a predetermined pressure is reached in the system. The control has no effect on the operation of downstream devices in implement circuits, for example, and control is provided by simple on-off solenoid valve action. Additionally, the valve mechanism of this embodiment can be used independently of downstream functions by connecting the outlet line 104 to sump, rather than to downstream valves of the implement circuit.

From the foregoing description of the embodiments disclosed, it will be noted that an overspeed protection control has been disclosed wherein the valve means are selectively operable to cause an increase in pressure in a circuit supplied by a pump driven by a prime mover with a resulting increase in load torque on the prime mover and with means responsive to the engine speed exceeding a predetermined value to render the valve means operable.

The torque imposed on the engine by the pump for the implement circuit is a function of pump displacement and pressure. Reference herein to a fixed displacement pump is inclusive of a conventional fixed displacement pump as well as any other pump which will effect increased torque loading of an engine in response to a pressure rise and including a variable displacement pump whose maximum displacement might be of a magnitude whereby a pressure rise could increase loading of the engine.

We claim:

1. An overspeed protection control for an engine which drives at least one pump comprising, a hydraulic circuit for a fluid operated device connected to the outlet of said pump, valve means selectively operable to cause an increase in pressure in said circuit and a resulting increase in load torque on the engine and ineffective to control the pressure of the fluid in the circuit when engine speed is below a predetermined value, and means responsive to the engine speed exceeding a predetermined value to render said valve means operable and increase the pressure in the circuit.

2. A overspeed protection control as defined in claim 1 wherein said responsive means includes an orifice in said circuit and a valve responsive to a predetermined pressure drop across the orifice resulting from a particular pump flow rate to render said valve means operable.

3. An overspeed protection control as defined in claim 2 wherein said valve means is a relief valve and said valve is a hydraulically piloted directional valve having a pair of ports connecting said valve into said hydraulic circuit and an additional port connected to said relief valve.

4. An overspeed protection control as defined in claim 2 wherein said valve means includes a valve member positioned in said hydraulic circuit and movable between positions which open and close said hydraulic circuit, and said valve is movable to a position to apply pressure to said valve member to urge the valve member in a direction to close said hydraulic circuit.

5. An overspeed protection control as defined in claim 4 wherein said valve controls a flow passage from the hydraulic circuit upstream of the orifice to said valve member for applying said pressure to said valve member, and a high pressure relief valve in said flow passage.

6. An overspeed protection control as defined in claim 1 wherein said responsive means includes a power operated valve and a power circuit for said last-mentioned valve including means sensing engine speed and operable to move said power operated valve and cause operation of said valve means when a predetermined engine speed is exceeded.

7. An overspeed protection control as defined in claim 6 wherein said valve means includes a valve member positioned in said hydraulic circuit and movable relative to a valve seat between positions which open and close said hydraulic circuit, a chamber housing said valve member, a passage with an orifice connecting said chamber and said hydraulic circuit upstream of the valve seat, and said power operated valve controlling communication between said chamber and the hydraulic circuit downstream of the valve seat whereby said chamber has a pressure determined by that of the hydraulic circuit either upstream of downstream of the valve seat dependent upon actuation of the power operated valve.

8. An overspeed protection control as defined in claim 7 including a relief valve in communication with said chamber to limit the pressure therein when the pressure is determined by the hydraulic circuit upstream of the valve seat.

9. An overspeed protection control for an engine having a fixed displacement pump driven thereby by increasing loading on the engine when the engine speed is excessive comprising, a hydraulic circuit connected to the pump outlet for utilization of pumped fluid, means selectively operable to restrict flow in said circuit and increase back pressure on said pump, and means responsive to engine speed exceeding a predetermined value to render said flow restricting means operable.

10. An overspeed protection control for an engine which drives a fixed displacement pump for an implement circuit and a hydrostatic transmission including a pump and a motor comprising, a hydraulic implement circuit connected to the outlet of said fixed displacement pump, valve means selectively operable to increase pressure in said implement circuit and impose a load torque on said engine, and means responsive to the speed of the engine exceeding a predetermined value to render said valve means operable.

11. An overspeed protection control for an engine which drives a fixed displacement pump comprising, a hydraulic circuit suplied by the pump, an orifice in said circuit, a relief valve connected to sump, a pilot operated valve having a pair of ports for connection into said circuit and a third port for connection to said relief valve, and means for applying the differential pressure across said orifice to said pilot operated valve whereby a predetermined pressure differential caused by a predetermined fluid flow proportional to engine speed moves said pilot operated valve to direct excess fluid flow to the relief valve and cause a pressure rise in the hydraulic circuit to a valve determined by the setting of the relief valve and impose a load torque on the engine to reduce engine speed.

12. An overspeed protection control for an engine which drives a fixed displacement pump comprising, a hydraulic circuit supplied by the pump, valve means in said circuit including a valve member movable to a closed position against a valve seat to block flow through said circuit, a chamber housing said valve member, spring means in said chamber urging said valve member toward the valve seat, and means operable when the engine speed exceeds a predetermined value to cause fluid pressure build-up in said chamber and urge the valve member toward the valve seat to increase the load torque on the engine.

13. An overspeed protection control as defined in claim 12 wherein said operable means includes an orifice in said hydraulic circuit ahead of said valve seat, a control valve positionable in response to the pressure differential across the orifice, a line extending from the control valve to said chamber, and said control valve having connections to a pressure source and a sump whereby the position of the control valve establishes the pressure in said chamber.

14. An overspeed protection control as defined in claim 13 wherein a relief valve is connected to said line to limit the pressure in said chamber.

15. An overspeed protection control as defined in claim 12 wherein said operable means includes a passage between said chamber and the hydraulic circuit downstream of the valve seat to establish a common pressure therein, a power operated control valve operable to a closed position to close said passage, an orific passage connecting said hydraulic circuit upstream of the valve seat with said chamber whereby the chamber is at the pressure existing upstream of the valve seat when the power operated control valve is closed, a relief valve in communication with said chamber to limit the pressure therein, and control means responsive to engine speed to close said control valve.

16. An overspeed protection control for a prime mover which drives at least one pump which can increase torque loading of the prime mover in response to a pressure rise comprising, a hydraulic circuit connected to the outlet of said pump, means ineffective on pressure in said circuit when the speed of the prime mover is below a predetermined value and selectively operable to cause an increase in pressure in said circuit and a resulting increase in load torque on the prime mover, and means responsive to the speed of the prime mover exceeding a predetermined value to render said first-mentioned means operable.

17. An overspeed protection control as defined in claim 16 wherein said responsive means includes an orifice in said circuit to establish a pressure differential thereacross which is indicative of flow rate in the circuit and prime mover speed.

18. An overspeed protection control as defined in claim 16 wherein said responsive means includes a prime mover speed detector.

* * * * *

Disclaimer 3,999,386.—*Stanley W. Crull and Donald J. MacIntosh*, Ames, Iowa. OVER-SPEED PROTECTION CONTROL FOR AN ENGINE. Patent dated Dec. 28, 1976. Disclaimer filed June 22, 1981, by the assignee, *Sundstrand Corp.*

Hereby enters this disclaimer to claim 3 of said patent.

[*Official Gazette Sept. 15, 1981.*]